United States Patent
Pike et al.

(10) Patent No.: US 6,273,488 B1
(45) Date of Patent: Aug. 14, 2001

(54) SYSTEM AND METHOD FOR REMOVING LIQUID FROM REAR WINDOW OF A VEHICLE

(75) Inventors: Ryan E. Pike, Rochester Hills; Vijayen S. Veerasamy, Farmington Hills, both of MI (US)

(73) Assignee: Guardian Industries Corporation, Auburn Hills, MI (US)

( * ) Notice: Subject to any disclaimer, the term of this patent is extended or adjusted under 35 U.S.C. 154(b) by 0 days.

(21) Appl. No.: 09/512,798

(22) Filed: Feb. 25, 2000

Related U.S. Application Data

(63) Continuation-in-part of application No. 09/303,548, filed on May 3, 1999, and a continuation-in-part of application No. 09/442,805, filed on Nov. 18, 1999.

(51) Int. Cl.$^7$ ........................................................ B60J 1/20
(52) U.S. Cl. ........................... 296/91; 296/180.1; 296/41; 427/476
(58) Field of Search ............................. 296/180.1, 180.2, 296/180.4, 91, 96.15; 427/562; 430/59

(56) References Cited

U.S. PATENT DOCUMENTS 2,919,952    1/1960    Riddle et al. .

(List continued on next page.)

FOREIGN PATENT DOCUMENTS

| | | |
|---|---|---|
| 3739591 | 6/1989 | (DE) . |
| 60-38236 | 2/1985 | (JP) . |
| 62-12480 | 2/1987 | (JP) . |
| WO 94/12680 | 6/1994 | (WO) . |
| WO 98/45847 | 10/1998 | (WO) . |

OTHER PUBLICATIONS

U.S Patent Application Ser. No. 09/303,548, filed May 3, 1999.
U.S Patent Application Ser. No. 09/442,805, filed Nov. 18, 1999.
U.S Pentent Application Ser. No. 09/583.862, filed Jun. 1, 2000.
U.S Patent Application Ser. No. 09/617,815, filed Jul. 17, 2000.
U.S Patent Application Ser. No. 09/627,441, filed Jul. 28, 2000.
U.S Patent Application Ser. No. 09/657,132, filed Sep. 7, 2000.
IBM Technical Disclosure Bulletin, vol. 36, No. 1, Jan. 1993 "Surface Hardening of Ceramic and Glass Materials".
IBM Technical Disclosure Bulletin, vol. 36, No. 03, Mar. 1993 "Surface Hardening of Ceramic and Glass Materials".
"Highly Tetrahedral, Diamond–Like Amorphous Hydrogenated Carbon Prepared from a Plasman beam Source", pp. 2797–2799, Arp Day 5/94.

(List continued on next page.)

*Primary Examiner*—Joseph D. Pape
*Assistant Examiner*—Kiran B. Patel
(74) *Attorney, Agent, or Firm*—Nixon & Vanderhye P.C.

(57) ABSTRACT

A system and method for efficiently removing rain water and the like from a rear window (backlite) of a vehicle. A rear spoiler or air deflector is provided for redirecting air toward the backlite and causing the speed of air flow to increase. A hydrophobic coating is provided on the major exterior surface of the backlite. Air directed by the air deflector over and/or across the surface of the backlite functions to remove the rain water and the like from the backlite. In certain embodiments, the hydrophobic coating may include diamond-like carbon (DLC) deposited on the substrate in a manner to increase its hydrophobicity.

17 Claims, 4 Drawing Sheets

U.S. PATENT DOCUMENTS

| | | |
|---|---|---|
| 3,015,518 | 1/1962 | Nelson . |
| 3,276,811 | 10/1966 | Schmidt . |
| 3,647,257 | 3/1972 | Litchfield ............................... 296/91 |
| 3,729,223 | 4/1973 | Leissa ................................... 296/91 |
| 4,174,863 | 11/1979 | Götz . |
| 4,603,898 | 8/1986 | Odagawa et al. . |
| 4,674,788 | 6/1987 | Ohmura et al. . |
| 4,881,772 | 11/1989 | Feinberg . |
| 4,999,215 | 3/1991 | Akagi et al. ............................ 427/41 |
| 5,199,762 | 4/1993 | Scheele et al. ................... 296/180.1 |
| 5,234,248 | 8/1993 | Bosh ..................................... 296/91 |
| 5,249,836 | 10/1993 | Stanesic et al. ................. 296/180.1 |
| 5,314,723 | 5/1994 | Dutta et al. .......................... 427/476 |
| 5,318,806 | 6/1994 | Montogomery et al. ............ 427/491 |
| 5,338,088 | 8/1994 | Stanesic ............................ 296/180.1 |
| 5,382,070 | 1/1995 | Turner . |
| 5,441,774 | 8/1995 | Dutta et al. .......................... 427/476 |
| 5,637,353 | 6/1997 | Kimock et al. . |
| 5,688,020 | 11/1997 | Burg .................................. 296/180.1 |
| 5,800,918 | 9/1998 | Chartier et al. . |
| 5,845,960 | 12/1998 | Koike et al. . |
| 5,846,649 | 12/1998 | Knapp et al. . |
| 5,858,477 | 1/1999 | Veerasamy et al. . |
| 5,900,342 | 5/1999 | Visser et al. . |
| 5,941,595 | 8/1999 | Schroeder et al. ................ 296/180.1 |
| 6,077,569 | 6/2000 | Knapp et al. ........................ 427/562 |

OTHER PUBLICATIONS

"Electronic Density of States in Highly Tetrahedral Amorphous Carbon", Veerasamy et al., pp. 319–326, Aug. 6, 1993 XP002041954.

"Deposition of Carbon Films by a Filtered Cathodic Arc" Kuhn et al., pp. 14350–1354, Aug. 31, 1992.

"Optical and Electronic Properties of Amorphous Diamond" Veerasamy et al., pp. 782–787, 2/93.

"Preparation and Properties of Highly Tetrahedral Hydrogenated Amorphous Carbon", Weiler et al., vol. 53, pp. 1594–1607, Jan. 1990.

"Tetrahedral Amorphous Carbon" Deposition, Characterisation and Electronic Properties, Verrasamyr Jul. 1994.

Fig.1
(PRIOR ART)
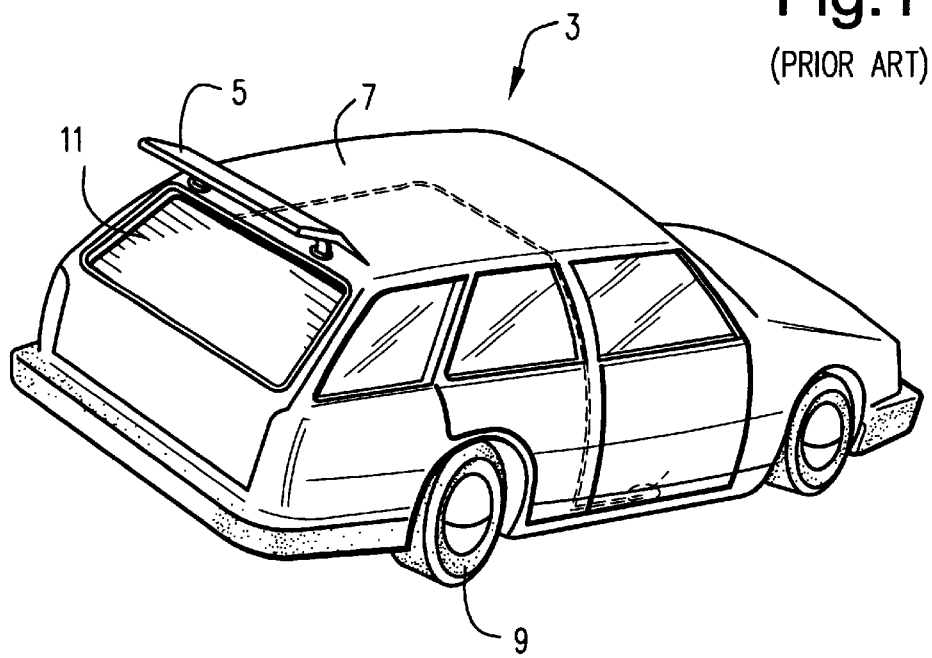
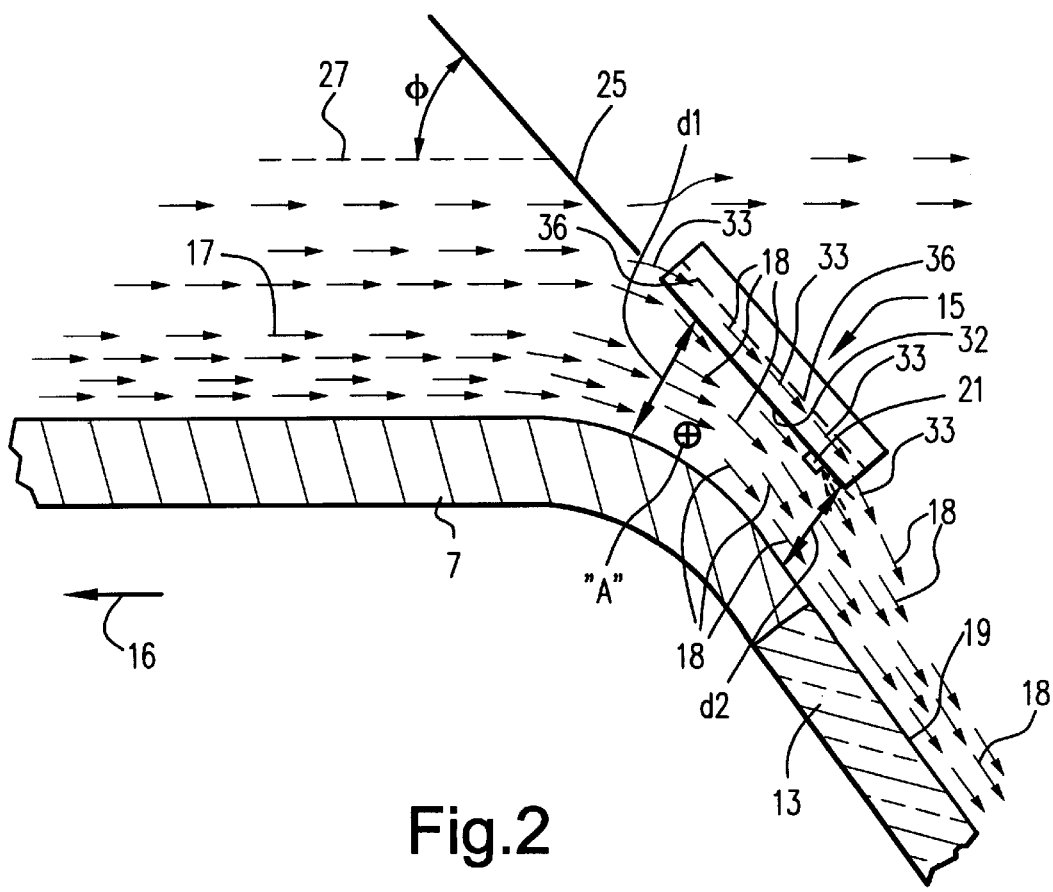
Fig.2

SYSTEM AND METHOD FOR REMOVING LIQUID FROM REAR WINDOW OF A VEHICLE

This is a continuation-in-part (CIP) of U.S. patent applications Ser. No. 09/303,548, filed May 3, 1999, and Ser. No. 09/442,805, filed Nov. 18, 1999, the disclosures of which are both hereby incorporated herein by reference in their entireties.

This invention relates to a system and method for removing liquid from a rear window (i.e., backlite) of a vehicle such as a car, truck, or sport utility vehicle. More particularly, the system and/or method may include a rear spoiler or air deflector designed to accelerate air/wind flow and direct the same toward the backlite which may include a hydrophobic coating provided thereon, so that liquid (e.g., rain) and/or dirt may be easily removed from the backlite.

BACKGROUND OF THE INVENTION

Conventionally, rain and dirt are typically removed from vehicle backlites (i.e., rear windows) using a rear wiper(s), especially in sport utility vehicles. Unfortunately, rear wipers tend to be rather fragile, costly and prone to damage.

In view of the above, it is apparent that there exists a need in the art for a system and corresponding method for removing rain and/or dirt from vehicle backlites without the need for use of a rear wiper.

Rear spoilers for directing air/wind onto vehicle backlites are known in the art. For example, see U.S. Pat. Nos. 4,674,788, 4,881,772 and 5,845,960, the disclosures of which are hereby incorporated herein by reference. The '788 patent discloses a rear spoiler which may be manipulated between two different positions. FIG. 1 is a perspective view of vehicle 3 including the '788 rear spoiler 5 mounted thereon. In the first position, spoiler 5 diverts air flowing along upper vehicle body surface 7 (i.e., roof) upwardly so as to exert a downward force and enhance traction of vehicular wheels 9. In the second position, spoiler 5 guides air flow toward a rear window (i.e., backlite) 11 surface so as to remove rain water, dust and so forth from the major exterior surface thereof.

Unfortunately, the system of the '788 patent is less than desirable for at least the following reasons. First, while the spoiler may guide air flow toward the backlite, it does not serve to accelerate the speed of the air flow. Thus, when the vehicle is traveling at rather slow speeds (e.g., 20 mph), the air flow will often be insufficient to clean/remove rain and the like from the surface of backlite 11.

Second, the backlite appears to be of conventional glass in the '788 patent (the contact angle θ of conventional uncoated soda lime silica glass is about 22–24 degrees). As a result, even when air is caused to flow across the surface of the backlite, rain may not be sufficiently removed therefrom due to the inherent tendency of glass to hold water on its surface due to its naturally low contact angle θ.

The '772 and '960 patents also disclose rear spoilers designed to direct air flow toward backlites. Unfortunately, the '772 and '960 patents suffer from the same problem as the '788 patent in that the backlite appears to be of conventional glass thus having an inherently low contact angle θ. As a result, even when air is caused to flow across the surface of the backlite, rain may not be sufficiently removed therefrom due to the natural tendency of glass to hold water on its surface due to its inherently low contact angle θ.

It will be apparent from the above that there exists a need in the art for a system and/or method for efficiently removing water (e.g., rain) from the exterior surface of a rear backlite.

It is a purpose of different embodiments of this invention to fulfill any or all of the above described needs in the art, and/or other needs which will become apparent to the skilled artisan once given the following disclosure.

SUMMARY OF THE INVENTION

An object of this invention is to provide a system and/or method for efficiently removing liquid such as rain from an exterior surface of a vehicle backlite (i.e., rear window).

Another object of this invention is to reduce the need for a rear wiper on a vehicle by providing a system and/or method which may remove a significant amount of liquid such as rain from the backlite without the need for a wiper.

Another object of this invention is to provide a rear spoiler including a plurality of venturi-like channels or passages therein for accelerating air flow and directing the accelerated air flow toward a surface of the backlite.

Another object of this invention is to provide a hydrophobic coating on the exterior major surface of a vehicle backlite so as to enable air flowing over the surface to more easily remove (or blow off) liquid such as rain therefrom.

Yet another object of this invention is to provide a hydrophobic coating on a vehicle backlite to be used in combination with a spoiler designed to accelerate air flow and/or direct the same toward the backlite with hydrophobic coating thereon, in order to efficiently remove liquid such as rain from the coated surface of the backlite. This may eliminate the need for a rear wiper in certain embodiments, and in other embodiments where a rear wiper is provided on the vehicle may reduce the need for its use to remove rain and/or dirt from the backlite's exterior major surface.

Another object of this invention is to provide the backlite with a hydrophobic coating including $SP^3$ carbon—carbon bonds and a wettability W with regard to water of less than or equal to about 23 mN/m, more preferably less than or equal to about 21 mN/m, and most preferably less than or equal to about 20 mN/m, and in most preferred embodiments less than or equal to about 19 mN/meter (these units may also be explained or measured in Joules per unit area $(mJ/m^2)$.

Another object of this invention is to provide the backlite with a hydrophobic coating including $sp^3$ carbon—carbon bonds and a surface energy $\gamma_c$ of less than or equal to about 20.2 mN/m, more preferably less than or equal to about 19.5 mN/m, and most preferably less than or equal to about 18 mN/m. Another object of this invention is to provide the backlite with a hydrophobic coating thereon, the backlite with coating having an initial (i.e. prior to being exposed to environmental tests, rubbing tests, acid tests, UV tests, or the like) water contact angle θ of at least about 70 degrees, more preferably of at least about 100 degrees, even more preferably of at least about 110 degrees, and most preferably of at least about 125 degrees.

Another object of this invention is to provide a hydrophobic coating for a vehicle backlite, wherein at least about 15% (more preferably at least about 25%, and most preferably at least about 30%) of the bonds in the coating are $sp^3$ carbon—carbon (C—C) bonds; and wherein the coating includes by atomic percentage at least about 5% silicon (Si) atoms (more preferably at least about 15%, and most preferably at least about 20% Si), at least about 5% oxygen (O) atoms (more preferably at least about 15% and most preferably at least about 20%), at least about 5% hydrogen (H) atoms (more preferably at least about 10% and most preferably at least about 15%) taking into consideration either the coating's entire thickness or only a thin layer portion thereof. In certain embodiments, an increased percentage of H atoms may be provided near the coating's outermost surface. In certain embodiments, the coating has approximately the same amounts of C and Si atoms.

Another object of this invention is to provide a coating for a vehicle backlite, wherein the coating includes a greater number of $sp^3$ carbon—carbon (C—C) bonds than $SP^2$ carbon—carbon (C—C) bonds. In certain of these embodiments, the coating need not include any $sp^2$ carbon—carbon (C—C) bonds.

Another object of this invention is to provide a diamond-like carbon (DLC) coating on the major exterior surface of a vehicle backlite, wherein the coating includes different portions or layers with different densities and different $sp^3$ carbon—carbon bond percentages. The ratio of $sp^3$ to $sp^2$ carbon—carbon bonds may be different in different layers or portions of the coating. Such a coating with varying compositions therein may be continuously formed by varying the ion energy used in the deposition process so that stresses in the coating are reduced in the interfacial portion/layer of the DLC coating immediately adjacent the underlying substrate. Thus, a DLC coating may have therein an interfacial layer with a given density and $sp^3$ carbon—carbon bond percentage, and another layer portion proximate a mid-section of the coating having a higher density of $sp^3$ carbon—carbon (C—C) bonds. The outermost layer portion at the surface of the coating may be doped (e.g. addition of Si, O and/or F) so that this surface portion of the coating is less dense which increases contact angle and decreases the dispersive component of surface energy so as to improve hydrophobic characteristics of the coating.

Still another object of this invention is to fulfill any or all of the above-listed objects and/or needs.

Generally speaking, this invention fulfills any or all of the above described needs or objects by providing a method of blowing water off of a rear window of a vehicle, the method comprising the steps of:

providing a vehicle including the rear window and an air deflector mounted at an elevation above at least a portion of the rear window, an exterior surface of the rear window having a contact angle θ of at least about 70 degrees;

the air deflector redirecting air flow flowing over an upper surface of the vehicle and causing the redirected air flow to flow toward the rear window at an increased rate; and the redirected air flow flowing across an exterior surface of the rear window having a contact angle of at least about 70 degrees so as to remove water from the surface of the rear window.

This invention further fulfills any of all of the above listed needs and/or objects by providing a system for enabling rain water to be removed from a major exterior surface of a backlite (i.e., rear window) of a vehicle, the system comprising:

an air deflector for redirecting air from flowing in a first direction across a surface of the vehicle to a second direction in which air flows downwardly toward the backlite, and for causing at least a portion of the air flowing the second direction to flow faster than air in the first direction; and wherein said backlite includes a substrate with a hydrophobic coating thereon, so that the major exterior surface of the backlite has an initial contact angle θ of at least about 70 degrees.

This invention will now be described with respect to certain embodiments thereof, along with reference to the accompanying illustrations.

IN THE DRAWINGS

FIG. 1 is a perspective view of a vehicle with a conventional rear spoiler mounted thereon.

FIG. 2 is a side view of a portion of a vehicle according to an embodiment of this invention, including respective portions of the vehicle backlite and roof illustrated cross sectionally and the rear air deflector or spoiler illustrated in an elevational manner (not cross sectionally).

DETAILED DESCRIPTION OF CERTAIN EMBODIMENTS OF THIS INVENTION

Figure 3:
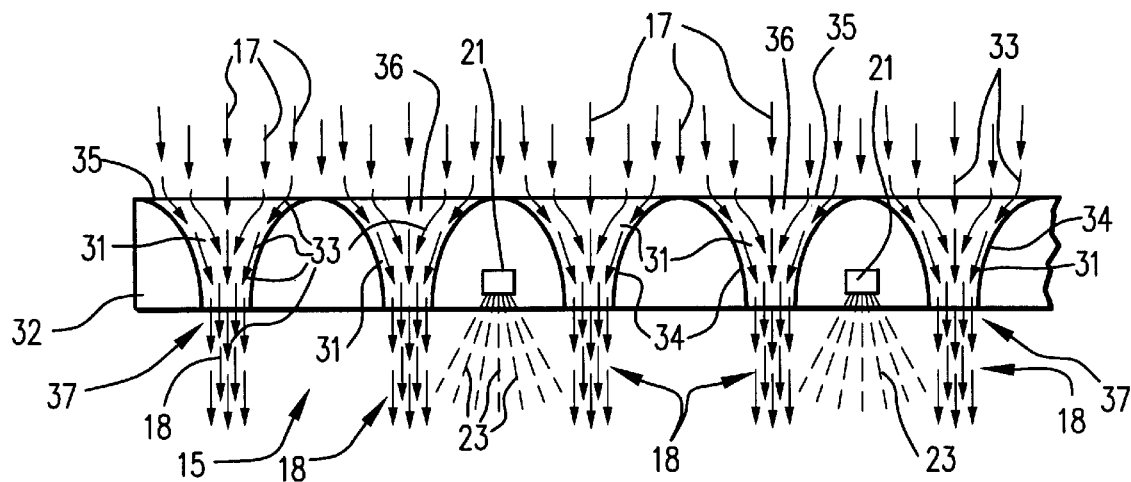
FIG. 3 is an elevation or plan view of a portion of the rear air deflector of FIG. 2 according to one embodiment of this invention, taken from a viewpoint "A" located between the deflector and roof in FIG. 2.

Referring now more particularly to the accompanying drawings in which like reference numerals indicate like elements throughout the accompanying views.

Figure 4:
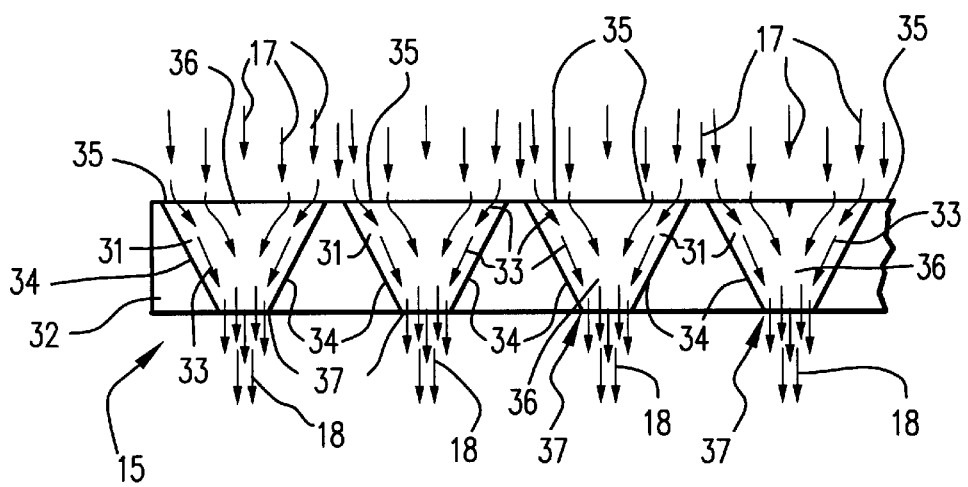
FIG. 4 is an elevation or plan view of a portion of the rear air deflector of FIG. 2 according to another embodiment of this invention, taken from a viewpoint "A" located between the deflector and roof in FIG. 2.

FIG. 2 illustrates vehicle upper surface or roof section 7 in cross section, vehicle rear window or backlite 13 in cross section, and rear spoiler or air deflector 15 in an elevational manner. FIGS. 3–4 are elevational or plan view of a portion of deflector 15 as viewed from approximately point "A" in FIG. 2, according to different embodiments of this invention.

Referring to FIGS. 2–4, when the vehicle (e.g., see vehicle 3 in FIG. 1 or any other type of vehicle such as a sport utility vehicle, sports car, mini-van, sedan, or the like) is being driven in the forward direction 16, deflector 15 functions to (i) redirect air 17 flowing across the roof 7 of the vehicle downwardly in a direction 18 toward the exterior major surface 19 of backlite 13, (ii) accelerate the speed of air flow as the air is directed toward surface 19 of backlite 13, and/or (iii) support one or more spray nozzles 21 for spraying or otherwise directing cleaning fluid (e.g., water or cleanser) 23 onto surface 19 of backlite 13 so that dirt and the like may be more easily removed therefrom (i.e., blown off) by airflow 18 passing over the surface of backlite 13.

In certain embodiments, a portion of rear air deflector 15 may define a plane 25 which is angled φ from about 25–60 degrees, more preferably from about 40–50 degrees, relative to the horizontal 27. This causes the air deflecting surfaces of deflector 15 to be aligned in similar angle(s) relative to the horizontal so that air 17 can be redirected 18 toward surface 19 of backlite 13 to be cleaned. Deflector alignment angle φ is chosen for each application as a function of the inclination of the backlite and/or roof of the vehicle.

Conventional glass tends to hold water thereon (i.e., has a low contact angle). Thus, it is difficult to remove water (e.g., rain) from the surface of conventional backlite simply by causing air to be blown over the surface of the backlite. This is especially true when the vehicle is moving at relatively slow speeds of from about 0–35 miles per hour (mph). In order to solve this problem, applicants have provided a hydrophobic coating (see FIGS. 5–7 and 9) on the major exterior surface 19 of backlite 13 and have also designed deflector 15 so that it may increase the speed of airflow as air is directed toward the hydrophobically coated backlite. This combination (i.e., hydrophobic coating on the backlite with an air flow accelerating deflector) enables water and the like to be easily removed from surface 19 of backlite 13 by airflow 18 when the vehicle is moving even at lower speeds of from about 20–35 mph.

Two aspects of deflector 15 cause acceleration of air flow (i.e., air flow 18 flows at a higher speed or rate than air flow 17). Each involves the area of air input to the area of deflector 15 area being greater than the area of air output from the area of deflector 15 (while the volume of air at each is approximately equal). First, distance d1 (the distance between an air input end of deflector 15 and the vehicle surface) is greater than distance d2 (the distance between an air output end of deflector 15 and the vehicle surface). Because d1>d2, the mass of the air flowing by the deflector is compacted by the deflector into a significantly smaller area so that the rate of flow increases as it is directed toward backlite 13. Second, the array of air flow channels 31 defined in the bottom surface 32 of the deflector, as best shown in the embodiments of FIGS. 3–4, also creates a venturi-like effect so as to increase the air flow speed as the air is directed toward surface 19 of the backlite.

When the vehicle is moving in forward direction 16, air 17 flows across the roof of the vehicle. A portion 33 of that air is driven into channels 31 defined in deflector 15. Because the channels are tapered or narrowed via channel sidewalls 34 from their input ends 35 to their respective output ends 37, the pressure of the air within the channels 31 increases so as to reach a maximum pressure in each channel at respective channel outputs 37. The compressed air exiting channels 31 is thus caused to flow at a higher speed (i.e., accelerate). The air leaving channels 31 expands and flows toward the backlite at 18. The tapering of air flow area due to d1>d2 creates a similar effect. The result is that the air flow speed at 18 as the air flow across surface 19 of backlite 13 is higher than the air flow speed at 17 before the air crosses deflector 15.

In certain embodiments of this invention, as shown in FIGS. 2–4, channels 31 are defined in the lower surface 32 of air deflector 15. In other words, channels 31 may be said to be cut out of the main body of the deflector, so that each channel 31 is defined by sidewalls 34 on opposing sides thereof and by a wall 36 of the main deflector body on another side thereof. Therefore, each channel 31 is enclosed on three elongated sides thereof, and open on a fourth elongated side along the length of the channel closest to the vehicle. By designing channels 31 so as to be open along the entire side(s) thereof facing the vehicle, a portion of the air flowing past the defector 15 is caused to flow through channels 31 while another portion is caused to flow closer to the vehicle and not within the confines of any of the channels. Because channels 31 cause air output therefrom at outlets 37 to flow in high rate jet-like streams (which do not cover the entire backlite surface 19), the channels being open at one major side thereof may enable the air flow across surface 19 to cover more of the surface area of the backlite and therefor do a better job of cleaning than if the channels were entirely enclosed along their respective lengths.

While channels 31 are open along one elongated side thereof in the illustrated embodiments, it is recognized that in other embodiments of this invention, channels 31 may be entirely enclosed along their respective lengths, with the only openings being those of the respective air inlets and air outlets. Moreover, while channels 31 are illustrated in FIGS. 3–4 as being approximately triangular in shape, such channels may be of any other suitable shape in other embodiments of this invention so long as air flow rate is increased thereby.

In certain embodiments of this invention, a plurality of window washing spray jets 21 may be provided on, e.g., an underneath side/surface of deflector 15, as shown in FIGS. 2 and 3. This enables the cleaning fluid output by jets 21 to be more efficiently inserted into the air flow streams 18 being directed toward the backlite in the direction of air flow.

In order to enable air flow 18 to efficiently remove liquid (e.g., rain water) and the like from surface 19 of backlite 13, the backlite includes a hydrophobic coating as illustrated in any of FIGS. 5–7 and 9.

Figure 5:
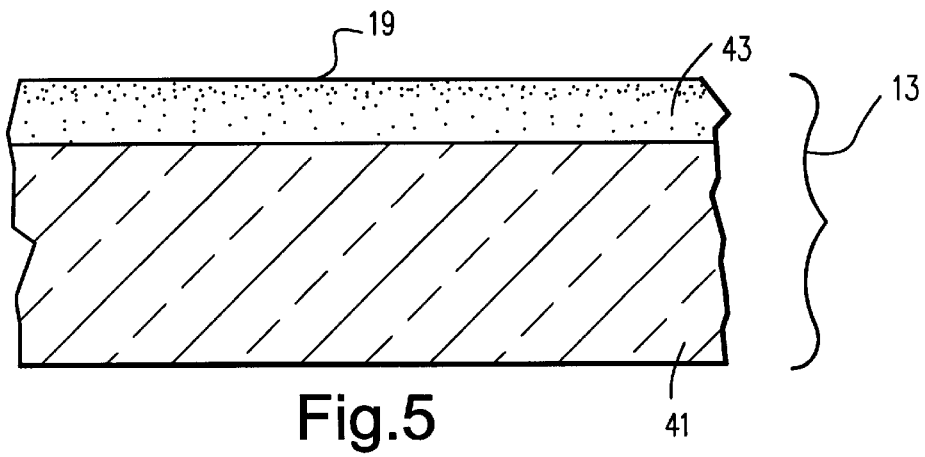
FIG. 5 is a side cross sectional view of a coated vehicle backlite according to an embodiment of this invention, wherein a glass or plastic substrate is provided with a DLC inclusive coating thereon having hydrophobic qualities.

FIG. 5 is a side cross-sectional view of a coated backlite 13 according to an embodiment of this invention, wherein at least one diamond-like carbon (DLC) inclusive protective coating(s) 43 is provided directly on substrate 41. Substrate 41 may be of glass, plastic, or the like. DLC inclusive coating 43 in the FIG. 5 embodiment includes at least one layer including highly tetrahedral amorphous carbon (ta-C). Coating 43 functions in a hydrophobic manner (i.e. it is characterized by high water contact angles θ and/or low surface energies as described below). In certain embodiments, coating 43 may be from about 50–1,000 angstroms (A) thick, more preferably from about 100–500 angstroms (A) thick, and most preferably from about 150–200 angstroms (A) thick.

In certain embodiments, hydrophobic coating 43 may have an approximately uniform distribution of $sp^3$ carbon—carbon bonds throughout a large portion of its thickness, so that much of the coating has approximately the same density. In other more preferred embodiments, hydrophobic coating 43 may include a lesser percentage of $sp^3$ carbon—carbon bonds near the interface with substrate 41, with the percentage or ratio of $sp^3$ carbon—carbon bonds increasing throughout the thickness of the coating toward the outermost surface. Thus, coating 43 may include at least one interfacing layer directly adjacent substrate 41, this interfacing layer having a lesser density and a lesser percentage of $sp^3$ carbon—carbon bonds than the middle portion of DLC inclusive coating 43. In general, the network of $sp^3$ carbon—carbon bonds functions to hold the other atoms (e.g. Si, O, F, and/or H atoms) around it in the coating. In certain embodiments, it is desired to keep number of $sp^2$ carbon—carbon bonds throughout the entire thickness of the coating to no greater than about 25%, more preferably no greater than about 10%, and most preferably from about 0–5%, as these type bonds are hydrophillic in nature and attract water and the like. Thus, in preferred embodiments, at least about 50% (more preferably at least about 75%, and most preferably at least about 90%) or the carbon—carbon bonds in coating 43 are of the sp$^3$ carbon—carbon type.

The presence of sp$^3$ carbon—carbon bonds in coating 43 increases the density and hardness of the coating, thereby enabling it to satisfactorily function in automotive environments. In certain embodiments, taking only a thin layer portion of, or alternatively the entire thickness of, coating 43 into consideration, at least about 15% (more preferably at least about 25%, and most preferably at least about 30%) of the bonds in the coating or coating layer portion are sp$^3$ carbon—carbon (C—C) bonds (as opposed to SP$^2$ carbon—carbon bonds). Coating 43 may or may not include sp carbon—carbon bonds in different embodiments (if so, most sp$^2$ carbon—carbon bonds may be provided at the portion of the coating interfacing with the underlying substrate).

In order to improve the hydrophobic nature of coating 43, atoms other than carbon (C) are provided in the coating in different amounts in different embodiments. For example, in certain embodiments of this invention coating 43 (taking the entire coating thickness, or only a thin 10 angstroms (A) thick layer portion thereof into consideration) may include in addition to the carbon atoms of the sp$^3$ carbon—carbon bonds, by atomic percentage, at least about 5% silicon (Si) atoms (more preferably at least about 15%, and most preferably at least about 20% Si), at least about 5% oxygen (O) atoms (more preferably at least about 15% and most preferably at least about 20% O), at least about 5% hydrogen (H) atoms (more preferably at least about 10% and most preferably at least about 15% H). In certain preferred embodiments, the atomic percentage of C and Si atoms in coating 43 are approximately equal. Optionally, coating 43 may include and from about 0–10% (atomic percentage) fluorine (F) (more preferably from about 0–5% F) in order to further enhance hydrophobic characteristics of the coating.

Figure 6:
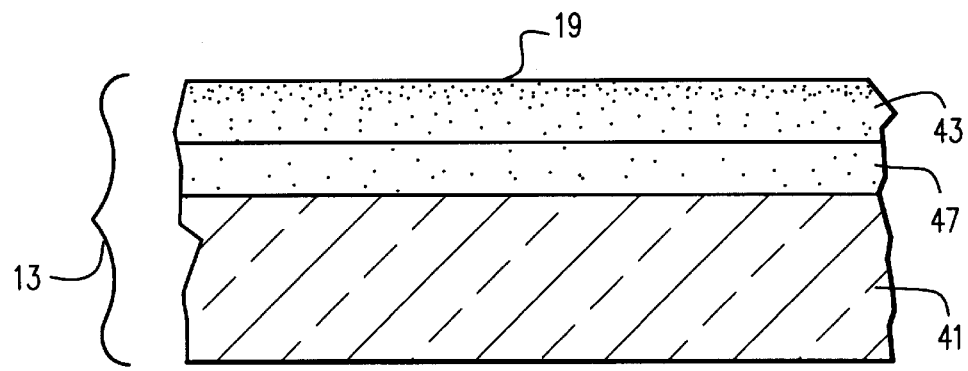
FIG. 6 is a side cross sectional view of a coated vehicle backlite according to another embodiment of this invention, wherein first and second DLC inclusive coatings are provided on a substrate of glass or plastic.
Figure 7:
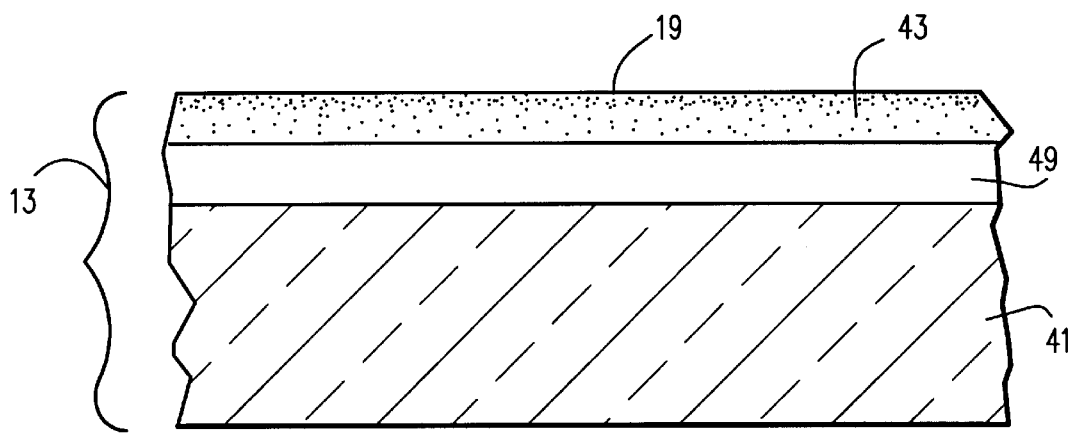
FIG. 7 is a side cross-sectional view of a coated vehicle backlite according to yet another embodiment of this invention wherein a low-E or other coating is provided on a substrate, with the hydrophobic DLC inclusive coating(s) of either of the FIG. 5 or FIG. 6 embodiments also on the substrate but over top of the intermediate low-E or other coating.

In certain embodiments, the outermost thin layer portion of hydrophobic coating 43 may also include a larger percentage of H atoms deposited via plasma ion beam treatment relative to the rest of the coating in order to reduce the number of polar bonds at the coating's surface, thereby improving the coating's hydrophobic properties by reducing the polar component of the surface energy. For example, in certain embodiments the outermost 5 angstroms (A) layer portion of coating 43 may include at least about 10% H atoms, more preferably at least about 25% H atoms, and most preferably at least about 50% H atoms. This higher concentration or percentage of H atoms near the surface of coating 43 is illustrated in FIGS. 5–7 by the dots which become more concentrated near the coating's surface 19. The deposition of these H atoms near the coating's surface 19 results in a more passive or non-polar coating surface. It is noted that deposition of the H atoms near the coating's surface 19 may tend to etch away any sp$^2$ or graphite C—C bonds in that area. This increase in H near the coating's surface also decreases the coating's density at this outermost 5 angstroms (A) layer portion.

Accordingly, in certain preferred embodiments of this invention, coating 43 as a whole or any 10 angstroms (A) thick layer portion thereof (e.g. a 10 angstroms (A) thick portion near the middle of the coating) may include in atomic percentage: from about 15–80% carbon (C) (mostly via sp$^3$ bonds), from about 5–45% oxygen (O), from about 5–45% silicon (Si), from about 0–30% hydrogen (H), and from about 0–10% fluorine (F). The outermost 5 angstroms (A) layer portion of coating 43 may include in atomic percentage: from about 5–60% carbon (C) (mostly via sp$^3$ bonds), from about 0–40% oxygen (O), from about 0–40% silicon (Si), from about 10–60% hydrogen (H), and from about 0–10% fluorine (F). As discussed above, additional H may be provided at the outermost portion of layer 43, largely at the expense of C, in order to reduce surface energy. An example of a 10 A thick layer portion near the middle of coating 43 is as follows, by atomic percentage: 35% C, 30% Si, 15% H, and 20% O. An example of the outermost 5 A thick layer portion of coating 43 is as follows, by atomic percentage: 20% C, 15% Si, 50% H, and 15% O. Optionally, in certain preferred embodiments, from about 0–5% F may also be provided in this outermost 5 A thick layer portion. It is noted that many of the Si, H, O, and F atoms in the coating are connected to many carbon atoms via sp$^3$ bonds.

A substantial number of Si—O, C—C sp$^3$, Si—C sp$^3$, and C—H sp$^3$ bonds are thus present. In certain embodiments, the Si—O bonds tend to cancel out some of the charge due to the carbon thereby reducing surface energy. The presence of the O also reduces density and permits the dispersive component of surface energy to be reduced. These examples are for purposes of example only, and are not intended to be limiting in any way.

In certain preferred embodiments, coating 43 has an average hardness of at least about 10 GPa, more preferably at least about 20 GPa, and most preferably from about 20–50 GPa. Such hardness renders coating 43 resistant to scratching, solvents, and the like. It is noted that the hardness and density of coating 43 and/or layer 47 may be adjusted by varying the ion energy of the depositing apparatus or process described below.

FIG. 6 is a side cross sectional view of a coated backlite 13 according to another embodiment of this invention, including substrate 41 (e.g. glass), hydrophobic DLC inclusive coating 43 as described above with regard to the FIG. 5 embodiment, and intermediate DLC inclusive layer 47 sandwiched therebetween. In certain embodiments, at least about 35% of the bonds in layer 47 may be of the sp$^3$ C—C type, more preferably at least about 70%, and most preferably at least about 80%. Any of the DLC inclusive layers described in Ser. No. 09/303,548 (incorporated herein by reference) may be used as layer 47. In effect, layer 47 may function in certain embodiments to reduce corrosion of the coated backlite (e.g. when the substrate includes Na, or is soda-lime-silica glass), while overlying coating 43 provides a hydrophobic function.

In the FIG. 7 embodiment, a low-E or other coating 49 is provided between substrate 41 and hydrophobic DLC inclusive coating 43. However, coating 43 is still on substrate 41 in the FIG. 7 embodiment. The term "on" herein means that substrate 41 supports DLC coating 43 or any layer portion thereof, regardless of whether or not other layer(s) (e.g. 47, 49) are provided therebetween. Thus, protective coating 43 may be provided directly on substrate 41 as shown in FIG. 5, or may be provided on substrate 41 with a low-E or other coating(s) 47 therebetween as shown in FIGS. 6–7. In still other embodiments, a low-E coating(s) 49 may be provided between hydrophobic coating 43 and DLC layer 47 of the FIG. 6 embodiment).

Exemplar coatings (in full or any portion of these coatings) that may be used as low-E or other coating(s) 49 are shown and/or described in any of U.S. Pat. Nos. 5,837,108, 5,800,933, 5,770,321, 5,557,462, 5,514,476, 5,425,861, 5,344,718, 5,376,455, 5,298,048, 5,242,560, 5,229,194, 5,188,887 and 4,960,645, which are all hereby incorporated herein by reference. Silicon oxide and/or silicon nitride coating(s) may also be used as coating(s) 49.

As will be discussed in more detail below, highly tetrahedral amorphous carbon (ta-C) forms $sp^3$ carbon—carbon bonds, and is a special form of diamond-like carbon (DLC). The amounts of $sp^3$ bonds may be measured using Raman finger-printing and/or electron energy loss spectroscopy. A high amount of $sp^3$ bonds increases the density of a layer, thereby making it stronger and allowing it to reduce soda diffusion to the surface of the coated article. However, in certain embodiments, there is a lesser percentage of such bonds at the outmost layer portion of coating 43 than at middle areas of the coating, so that H atoms may be provided in order to improve the coating's hydrophobic characteristics.

In certain embodiments, hydrophobic coating 43 is at least about 75% transparent to or transmissive of visible light rays, preferably at least about 85%, and most preferably at least about 95%.

When substrate 41 is of glass, it may be from about 1.5 to 5.0 mm thick, preferably from about 2.3 to 4.8 mm thick, and most preferably from about 3.7 to 4.8 mm thick. Thus, ta-C inclusive coating 43 and/or layer 47 reduce the amount of soda that can reach the surface of the coated article and cause stains/corrosion. In certain embodiments, substrate 41 includes, on a weight basis, from about 60–80% $SiO_2$, from about 10–20% $Na_2O$, from about 0–16% CaO, from about 0–10% $K_2O$, from about 0–10% MgO, and from about 0–5% $Al_2O_3$. In certain other embodiments, substrate 41 may be soda lime silica glass including, on a weight basis, from about 66–75% $SiO_2$, from about 10–20% $Na_2O$, from about 5–15% CaO, from about 0–5% MgO, from about 0–5% $Al_2O_3$, and from about 0–5% $K_2O$. Most preferably, substrate 41 is soda lime silica glass including, by weight, from about 70–74% $SiO_2$, from about 12–16% $Na_2O$, from about 7–12% CaO, from about 3.5 to 4.5% MgO, from about 0 to 2.0% $Al_2O_3$, from about 0–5% $K_2O$, and from about 0.08 to 0.15% iron oxide. In certain embodiments, any glass disclosed in U.S. Pat. No. 5,214,008 or U.S. Pat. No. 5,877,103, each incorporated herein by reference, may be used as substrate 41. Also, soda lime silica float glass available from Guardian Industries Corp., Auburn Hills, Mich., may be used as substrate 41.

Any such aforesaid glass substrate 41 may be, for example, green, blue or grey in color when appropriate colorant(s) are provided in the glass in certain embodiments.

In certain other embodiments of this invention, substrate 41 may be of borosilicate glass, or of substantially transparent plastic. In certain borosilicate embodiments, the substrate 41 may include from about 75–85% $SiO_2$, from about 0–5% $Na_2O$, from about 0 to 4% $Al_2O_3$, from about 0–5% $K_2O$, from about 8–15% $B_2O_3$, and from about 0–5% $Li_2O$.

When substrate 41 is coated with at least DLC coating 43 according to any of the FIGS. 5–7 embodiments, the resulting coated backlite 13 may have the following characteristics in certain embodiments: visible transmittance (Ill. A) greater than about 60% (preferably greater than about 70%, and most preferably greater than about 80%), UV (ultraviolet) transmittance less than about 38%, total solar transmittance less than about 45%, and IR (infrared) transmittance less than about 35% (preferably less than about 25%, and most preferably less than about 21%). Visible, "total solar", UV, and IR transmittance measuring techniques are set forth in U.S. Pat. No. 5,800,933, as well as the '008 patent, incorporated herein by reference.

Figure 8:
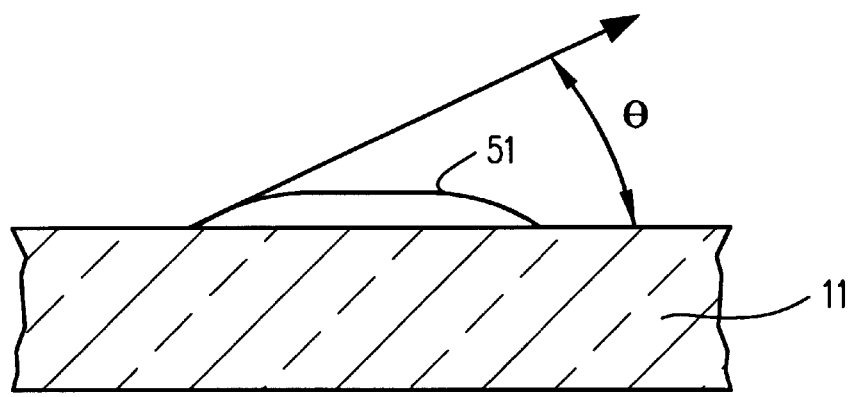
FIG. 8 is a side cross sectional partially schematic view illustrating a low contact angle θ of a drop on an uncoated glass substrate.
Figure 9:
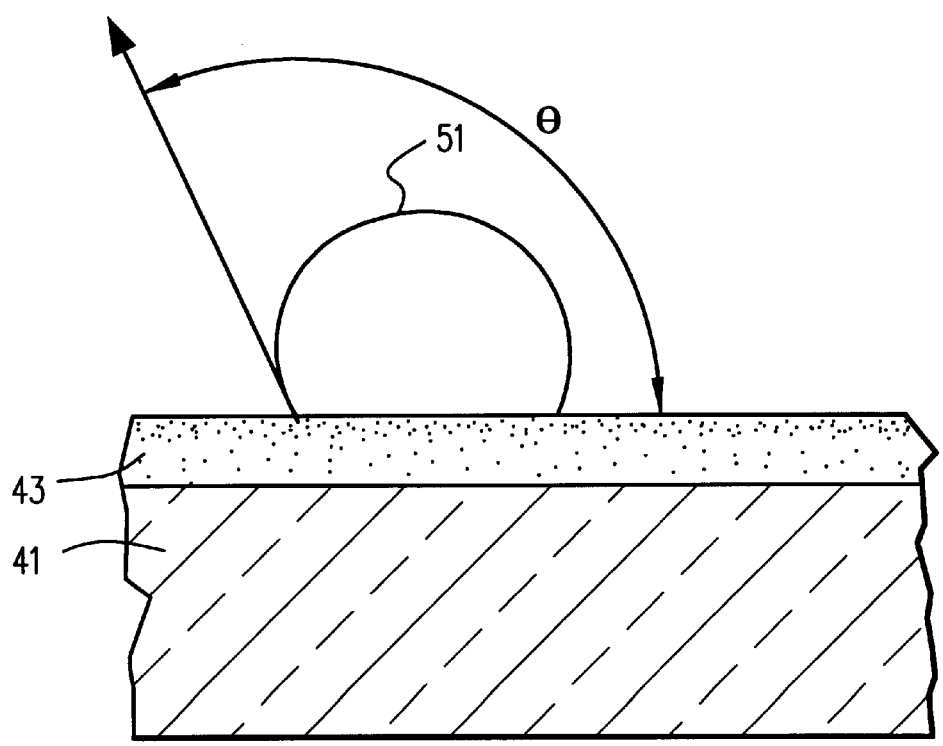
FIG. 9 is a side cross sectional partially schematic view illustrating the coated backlite of any embodiment herein and the contact angle θ of a water drop thereon.

Hydrophobic performance of coating 43 in any of the above embodiments is a function of contact angle $\theta$, surface energy $\gamma$, and wettability or adhesion energy W. The surface energy $\gamma$ of coating 43 may be calculated by measuring its contact angle $\theta$ (contact angle $\theta$ is illustrated in FIGS. 8–9). A sessile drop 51 of a liquid such as water is placed on the coating as shown in FIG. 9. A contact angle $\theta$ between the drop 51 and underlying coating 43 appears, defining an angle depending upon the interface tension between the three phases in the point of contact. Generally, the surface energy $\gamma_C$ of coating 43 can be determined by the addition of a polar and a dispersive component, as follows: $\gamma_C = \gamma_{CP} + \gamma_{CD}$, where $\gamma_{CP}$ is the coating's polar component and $\gamma_{CD}$ the coating's dispersive component. The polar component of the surface energy represents the interactions of the surface which is mainly based on dipoles, while the dispersive component represents, for example, van der Waals forces, based upon electronic interactions. Generally speaking, the lower the surface energy $\gamma_C$ of coating 43, the more hydrophobic the coating and the higher the contact angle $\theta$.

Adhesion energy (or wettability) W can be understood as an interaction between polar with polar, and dispersive with dispersive forces, between coating 43 and a liquid thereon such as water. $\gamma^P$ is the product of the polar aspects of liquid tension and coating/substrate tension; while $\gamma^D$ is the product of the dispersive forces of liquid tension and coating/substrate tension. In other words, $\gamma^P = \gamma_{LP}{}^* \gamma_{CP}$; and $\gamma^D = \gamma_{LD}{}^* \gamma_{CD}$; where $\gamma_{LP}$ is the polar aspect of the liquid (e.g. water), $\gamma_{CP}$ is the polar aspect of coating 43; $\gamma_{LD}$ is the dispersive aspect of liquid (e.g. water), and $\gamma_{CD}$ is the dispersive aspect of coating 43. It is noted that adhesion energy (or effective interactive energy) W, using the extended Fowkes equation, may be determined by:

$$W = [\gamma_{LP}{}^*\gamma_{CP}]^{1/2} + [\gamma_{LD}{}^*\gamma_{CD}]^{1/2} = \gamma_1(1+\cos\theta),$$

where $\gamma_1$ is liquid tension and $\theta$ is the contact angle. W of two materials (e.g. coating 43 and water thereon) is a measure of wettability indicative of how hydrophobic the coating is.

When analyzing the degree of hydrophobicity of coating 43 with regard to water, it is noted that for water $\gamma_{LP}$ is 51 mN/m and $\gamma_{LD}$ is 22 mN/m. In certain embodiments of this invention, the polar aspect $\gamma_{CP}$ of surface energy of coating 43 is from about 0 to 0.2 (more preferably variable or tunable between 0 and 0.1) and the dispersive aspect $\gamma_{CD}$ of the surface energy of coating 43 is from about 16–22 mN/m (more preferably from about 16–20 mN/m).

Using the above-listed numbers, according to certain embodiments of this invention, the surface energy $\gamma_C$ of coating 43 is less than or equal to about 20.2 mN/m, more preferably less than or equal to about 19.5 mN/m, and most preferably less than or equal to about 18.0 mN/m; and the adhesion energy W between water and coating 43 is less than about 25 mN/m, more preferably less than about 23 mN/m, even more preferably less than about 20 mN/m, and most preferably less than about 19 mN/m. These low values of adhesion energy W and coating 43 surface energy $\gamma_C$, and the high initial contact angles $\theta$ achievable, illustrate the improved hydrophobic nature of coatings 43 according to different embodiments of this invention.

The initial contact angle $\theta$ of a conventional glass substrate 41 with sessile water drop 51 thereon is typically from about 22–24 degrees, as illustrated in FIG. 8. Thus, conventional glass substrates are not particularly hydrophobic in nature. The provision of coating(s) 43 on substrate 41 causes the contact angle $\theta$ to increase to the angles discussed above, as shown in FIG. 9 for example, thereby improving the hydrophobic nature of the backlite 13. As discussed in Table 1 of 09/303,548, the contact angle $\theta$ of a ta-C DLC layer is typically from about 5 to 50 degrees. However, the makeup of DLC-inclusive coating 43 described herein enables the initial contact angle θ between coating 43 and a water drop (i.e. sessile drop 51 of water) to be increased in certain embodiments to at least about 100 degrees, more preferably at least about 110 degrees, even more preferably at least about 115 degrees, and most preferably at least about 125 degrees, thereby improving the hydrophobic characteristics of the DLC-inclusive material and enabling air flow 18 to more easily remove rain and the like from the surface of backlite 13. An "initial" contact angle θ means prior to exposure to environmental conditions such as sun, rain, humidity, etc.

Prior to coating 43 being formed on glass substrate 41, the top surface of substrate 41 is preferably cleaned by way of a first linear or direct ion beam source. For example, a glow discharge in argon (Ar) gas or mixtures of $Ar/O_2$ (alternatively $CF_4$ plasma) may be used to remove any impurities on the substrate surface. Such interactions are physio-chemical in nature. This cleaning creates free radicals on the substrate surface that subsequently can be reacted with other monomers yielding substrate surfaces with specialized properties. The power used may be from about 100–300 Watts. Substrate 41 may also be cleaned by, for example, sputter cleaning the substrate prior to actual deposition of coating 43; using oxygen and/or carbon atoms at an ion energy of from about 800 to 1200 eV, most preferably about 1,000 eV.

After cleaning, the deposition process begins using a linear ion beam deposition technique via a second ion beam source; with a conveyor having moved the cleaned substrate 41 from the first source to a position under the second source. The second ion beam source functions to deposit a ta-C/SiO (or ta-C/SiO:F in alternative embodiments) coating 43 onto substrate 41, as follows. In preferred embodiments, the ratio of C to Si in coating 43 is approximately 1:1 (i.e. 1:1 plus/minus about 20%). However, in other preferred embodiments (e.g. see XPS analyzed Sample Nos. 1–3 below), the ratio of C to Si in coating 43 may be from about 1:1 to 4:1. The dopant gas may be produced by bubbling a carrier gas (e.g. $C_2H_2$) through the precursor monomer (e.g. TMS or 3MS) held at about 70 degrees C (well below the flashing point). Acetylene feedstock gas ($C_2H_2$) is used in certain embodiments to prevent or minimize/reduce polymerization and to obtain an appropriate energy to allow the ions to penetrate the substrate 41 or other surface and subimplant therein, thereby causing coating 43 atoms to intermix with the surface of substrate 41 (or the surface of the growing coating) a few atom layers thereinto. In alternative embodiments, the dopant gas may be produced by heating or warming the monomer (e.g. to about 25–30 degrees C) so that vapor therefrom proceeds through a mass flow controller to the ion beam source; so that $C_2H_2$ is not needed. The actual gas flow may be controlled by a mass flow controller (MFC) which may be heated to about 70 degrees C. Oxygen ($O_2$) gas is independently flowed through an MFC. In certain embodiments, a target consisting essentially of approximately equal molar percentages of C and Si may be isostatically compressed at about 20 MPa. The temperature of substrate 41 may be room temperature; an arc power of about 1000 W may be used; precursor gas flow may be about 25 sccm; the base pressure may be about $10^{-6}$ Torr, and a Hoescht type carbon electrode may be used. Coating 43 is preferably free of pinholes to achieve satisfactory water repulsion and/or suppression of soda diffusion.

The C—C $sp^3$ bonding in coating 43 is preferably formed by having a predetermined range of ion energy prior to reaching substrate 41, or prior to reaching a coating or layer growing on the substrate. The optimal ion energy window for the majority of coating 43 is from about 100–200 eV (preferably from about 100–150 eV) per carbon ion. At these energies, the carbon in coating 43 (and layer 47) emulates diamond, and $sp^3$ C—C bonds form in coating 43. However, compressive stresses can develop in ta-C when being deposited at 100–150 eV. Such stress can reach as high as 10 GPa and can potentially cause delamination from many substrates. It has been found that these stresses can be controlled and decreased by increasing the ion energy during the deposition process to a range of from about 200–1,000 eV. The plasma ion beam source enables ion energy to be controlled within different ranges in an industrial process for large area deposition utilized herein. The compressive stress in amorphous carbon is thus decreased significantly at this higher ion energy range of 200–1,000 eV.

High stress is undesirable in the thin interfacing portion of coating 43 that directly contacts the surface of a glass substrate 41 in the FIG. 5 embodiment (and the thin interfacing layer portion of layer 47 in the FIG. 6 embodiment). Thus, for example, the first 1–40% thickness (preferably the first 1–20% and most preferably the first 5–10% thickness) of coating 43 (or layer 47) is deposited on substrate 41 using high anti-stress energy levels of from about 200–1,000 eV, preferably from about 400–500 eV. Then, after this initial interfacing layer portion of coating 43 has been grown, the ion energy in the ion deposition process is decreased (either quickly or gradually while deposition continues) to about 100–200 eV, preferably from about 100–150 eV, to grow the remainder of coating 43 (or layer 47). Thus, in certain embodiments, because of the adjustment in ion energy during the deposition process, DLC inclusive coating 43 in FIGS. 5–7 has different densities and different percentages of $sp^3$ C—C bonds at different layer portions thereof (the lower the ion energy, the more $sp^3$ C—C bonds and the higher the density).

While direct ion beam deposition techniques are preferred in certain embodiments, other methods of deposition may also be used in different embodiments. For example, filtered cathodic vacuum arc ion beam techniques may be used to deposit coating 43 and/or layer 47. Also, in certain embodiments, $CH_4$ may be used as a feedstock gas during the deposition process instead of or in combination with the aforesaid $C_2H_2$ gas. Alternatively, any of the deposition methods disclosed in U.S. Pat. No. 5,858,477 may be used to deposit coating 43 and/or layer 47, the disclosure of U.S. Pat. No. 5,858,477 hereby being incorporated herein by reference.

In certain alternative embodiments of this invention, the second source may deposit a ta-C:SiO:F coating 43 on substrate 41 instead of a ta-C:SiO coating. The n, k and Tauc optical bandgap may be tailored by doping the bulk of coating 43 with F and/or H; where "n" is refractive index and "k" is extinction coefficient. As the refractive index n of glass is approximately 1.5, it is desirable in certain embodiments for the refractive index n of coating 43 to be close to that of the underlying glass substrate 41 in order to achieve good transmission and minimal reflection of the coated article. It is also desirable in certain embodiments for the "k" value to be low in order to achieve good transmission. In certain embodiments, the refractive index of coating 43 is from about 1.4 to 2.0, more preferably no greater than about 1.75, and most preferably from about 1.5 to 1.7. The refractive index n of the coating can also be altered using $CF_4$ or $CF_6$ as the doping gas. Fluorination of no more than about 5% atomic is preferred. The table below shows variation of n & k with atomic F content:

| F % | n@543 nm | k@543 nm | Eg(eV) |
|---|---|---|---|
| 0 | 2.2 | 0.02 | 2.0 |
| 1.5 | 1.75 | 0.007 | 2.9 |
| 3.0 | 1.65 | 0.0001 | 3.7 |

Thus, fluorination provides a way in which to independently tune the n & k to match desired optical properties of the substrate 41 in order to improve transmission and the like. Fluorination may also scavenge a graphitic $sp^2$ fraction within the carbon matrix thus leaving mostly $sp^3$ enriched carbon matrix.

A third ion beam source is optional. In certain embodiments of this invention, the hydrophobicity of coating 43 can be further enhanced using a plasma treatment by a third source or grafting procedure after the main portion of DLC-inclusive coating 43 has been deposited. This technique using a third source removes certain polar functional groups at the outermost surface, thereby altering the surface chemical reactivity (i.e. lowering surface energy) while the bulk of coating 43 remains the same or substantially unaffected. After a conveyor has moved the DLC-coated substrate from the second source station to a position under the third source, the plasma treatment by the third source introduces hydrogen (H) atoms into the outermost surface of coating 43, thereby making the coating's surface substantially non-polar and less dense than the rest of the coating 43. These H atoms are introduced, because $H_2$ or $ArH_2$ feedstock gas is used by source 63 instead of the $C_2H_2$ gas. Thus, the third source does not deposit any significant amounts of C atoms or Si atoms; but instead treats the outermost surface of the ta-C:SiO coating by adding H atoms thereto in order to improve its hydrophobic characteristics. This plasma treatment may also function to roughen the otherwise smooth surface. It is noted that $H_2$ feedstock gas is preferred in the third ion beam source when it is not desired to roughen the surface of coating 43, while $ArH_2$ feedstock gas is preferred in surface roughing embodiments. Additionally, a $CF_4$ RF induced plasma may be used to provide a striation process with RMS roughness of at least about 100 angstroms (A).

Contact angle θ of coating 43 with water increases with surface roughness as shown below, via certain examples performed in accordance with certain embodiments of this invention:

| Sample No. | Roughness RMS (A) | Contact Angle θ |
|---|---|---|
| 1 | 5 | 101° |
| 2 | 30 | 109° |
| 3 | 120 | 117° |

In certain alternative embodiments of this invention, the third source may be used to introduce F atoms to the outermost 5 A layer portion of coating 43 (in addition to or instead of the H atoms) in order to reduce surface energy. Fluorination of no more than about 5% (atomic percent) is preferred.

While in certain preferred embodiments of this invention, three separate ion beam sources are used to make coated backlites according to either of the FIG. 5–6 embodiments, in alternative embodiments it is recognized that a single ion beam source (linear, curved, or the like) may be used to perform each of the cleaning step, the deposition step of DLC-inclusive coating 43, and the plasma surface treatment for introducing H and/or F atoms into the outermost surface area of the coating. In such embodiments, the feedstock gas may be changed between each such process.

ADDITIONAL EXAMPLE SAMPLE NOS. 1–3

Three additional example coated substrates were manufactured and tested according to different embodiments of this invention as follows. They are additional Sample Nos. 1–3, each including a coating 43 according to an embodiment of this invention deposited on glass using tetramethylsilane (TMS) and $O_2$ gas introduced within the linear ion beam. All sample coatings 43 were of approximately the same thickness of about 750 A. A low energy electron flood gun was used to sharpen the spectral analysis conducted by x-ray photo-electron spectroscopy (XPS) for chemical analysis. In XPS analysis of a coating 43, high energy x-ray photons (monochromatic) impinge on the surface of coating 43. Electrons from the surface are ejected and their energy and number (count) measured. With these measurements, one can deduce the electron binding energy. From the binding energy, one can determine three things: elemental fingerprinting, relative quantity of elements, and the chemical state of the elements (i.e. how they are bonding). Components used in the XPS analysis include the monochromatic x-ray source, an electron energy analyzer, and electron flood gun to prevent samples from charging up, and an ion source used to clean and depth profile. Photoelectrons are collected from the entire XPS field simultaneously, and using a combination of lenses before and after the energy analyzer are energy filtered and brought to a channel plate. The result is parallel imaging in real time images. Sample Nos. 1–3 were made and analyzed using XPS, which indicated that the samples included the following chemical elements by atomic percentage (H was excluded from the chart below).

| Sample No. | C | O | Si | F |
|---|---|---|---|---|
| 1 | 54.6% | 23.7% | 20.5%, | 1.2% |
| 2. | 45.7% | 21.7% | 32.7% | 0% |
| 3. | 59.5% | 22.7% | 17.8% | 0% |

H was excluded from the XPS analysis because of its difficulty to measure. Thus, H atoms present in the coating Sample Nos. 1–3 were not taken into consideration for these results. For example, if Sample No. 1 included 9% H by atomic percentage, then the atomic percentages of each of the above-listed elements C, O, Si and F would be reduced by an amount so that all five atomic percentages totaled 100%.

In certain embodiments of this invention, coated backlites 13 have a contact angle θ of at least about 70°, more preferably at least about 80°, and even more preferably at least about 100° after a taber abrasion resistance test has been performed pursuant to ANSI Z26. 1. The test utilizes 1,000 rubbing cycles of coating 43, with a load a specified in Z26.1 on the wheel(s). Another purpose of this abrasion resistance test is to determine whether the backlite is resistive to abrasion (e.g. whether hazing is less than 4% afterwards). ANSI Z26. 1 is hereby incorporated into this application by reference.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A system for enabling rain water to be removed from an exterior surface of a backlite of a vehicle, said system comprising:

an air deflector for redirecting air from flowing in a first direction across the surface of the vehicle to a second direction in which air flows downwardly toward the backlite, and for causing at least a portion of the air flowing in the second direction to flow faster than air in the first direction; and wherein said backlite includes a substrate with a hydrophobic coating comprising diamond-like-carbon (DLC) thereon, said hydrophobic coating having an average hardness of at least about 10 GPa and being formed so that the exterior surface of the backlite has an initial contact angle θ of at least about 80 degrees.

2. The system of claim 1, wherein said substrate is a glass substrate comprising, on a weight basis:

$SiO_2$ from about 60–80%, $Na_2O$ from about 10–20%,

CaO from about 0–16%, $K_2O$ from about 0–10%,

MgO from about 0–10%, $Al_2O_3$ from about 0–5%;

and wherein said hydrophobic coating includes diamond-like carbon (DLC) having $sp^3$ carbon—carbon bonds; and wherein said hydrophobic coating has an initial contact angle θ with a sessile drop of water thereon of at least about 100 degrees, and an average hardness of at least about 10 GPa.

3. The system of claim 1, wherein said initial contact angle is at least about 110 degrees.

4. The system of claim 2, wherein said initial contact angle is at least about 125 degrees.

5. The system of claim 1, wherein said hydrophobic coating has a surface energy $\gamma_C$ of less than or equal to about 20.2 mN/m.

6. The system of claim 5, wherein said hydrophobic coating has a surface energy $\gamma_C$ of less than or equal to about 19.5 mN/m.

7. The system of claim 1, wherein said hydrophobic coating has a surface energy $\gamma_C$ of less than or equal to about 18.0 mN/m, and wherein the refractive index "n" of said coating is from about 1.5 to 1.7.

8. The system of claim 1, wherein said hydrophobic coating is in direct contact with said glass substrate, and wherein $sp^3$ carbon—carbon bonds of the DLC are subimplanted into the glass substrate.

9. The system of claim 1, wherein said hydrophobic coating has an average hardness of at least about 20 GPa.

10. The system of claim 9, wherein said hydrophobic coating has an average hardness of from about 20–80 GPa.

11. The system of claim 1, wherein said hydrophobic coating includes diamond like carbon (DLC) and wherein at least about 50% of carbon—carbon bonds in said hydrophobic coating are highly tetrahedral $sp^3$ carbon—carbon bonds.

12. The system of claim 1, wherein the outermost 10 angstroms (A) layer portion of said hydrophobic coating includes in atomic percentage: from about 5–60% carbon (C), from about 0–40% oxygen (O), from about 0–40% silicon (Si), from about 10–95% hydrogen (H), and from about 0–10% fluorine (F).

13. The system of claim 1, wherein at least one 10 angstroms (A) thick layer portion of said hydrophobic coating includes in atomic percentage: from about 15–80% carbon (C), from about 5–45% oxygen (O), from about 5–45% silicon (Si), from about 0–30% hydrogen (H), and from about 0–10% fluorine (F).

14. The system of claim 1, wherein the outermost 5 angstroms (A) layer portion of said hydrophobic coating includes in atomic percentage at least about 25% H.

15. The system of claim 1, wherein said air deflector includes an array of channels defined in a lower surface thereof in order to increase speed of air flow.

16. The system of claim 15, wherein each of said channels includes an inlet and an outlet, and wherein an area flow area at said inlet is greater than an air flow area at said outlet so that air may exit said channels at a higher rate than when entering the channels.

17. A method of blowing water off of a rear window of a vehicle, said method comprising the steps of:

providing a vehicle including the rear window and an air deflector mounted at an elevation above at least a portion of the rear window, an exterior surface of the rear window including a diamond-like-carbon (DLC) inclusive coating thereon, said coating having a contact angle θ of at least about 80 degrees and an average hardness of at least about 10 GPa, and wherein $sp^3$ carbon—carbon bonds of the DLC are subimplanted into a glass substrate of the rear window;

the air deflector redirecting air flow flowing over an upper surface of the vehicle and causing the redirected air flow to flow toward the rear window at an increased rate; and the redirected air flow flowing across an exterior surface of the rear window having the contact angle θ of at least about 80 degrees so as to remove water from the surface of the rear window.

* * * * *